United States Patent
Kwon et al.

(10) Patent No.: US 11,139,491 B2
(45) Date of Patent: Oct. 5, 2021

(54) THERMAL MANAGEMENT SYSTEM FOR FUEL CELL VEHICLE AND CONTROL METHOD THEREOF

(71) Applicant: HYUNDAI MOTOR COMPANY, Seoul (KR)

(72) Inventors: Hyuck Roul Kwon, Yongin-si (KR); Nam Woo Lee, Hwaseong-si (KR); Sung Wook Na, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 1338 days.

(21) Appl. No.: 15/371,111

(22) Filed: Dec. 6, 2016

(65) Prior Publication Data

US 2018/0114998 A1    Apr. 26, 2018

(30) Foreign Application Priority Data

Oct. 26, 2016   (KR) .................. 10-2016-0140404

(51) Int. Cl.

| | | |
|---|---|---|
| *H01M 8/04225* | (2016.01) | |
| *H01M 8/04746* | (2016.01) | |
| *H01M 8/04302* | (2016.01) | |
| *H01M 8/04029* | (2016.01) | |
| *H01M 8/04701* | (2016.01) | |
| *H01M 8/04007* | (2016.01) | |
| *H01M 8/0432* | (2016.01) | |
| *H01M 8/0438* | (2016.01) | |
| *H01M 8/1018* | (2016.01) | |

(52) U.S. Cl.
CPC ... *H01M 8/04225* (2016.02); *H01M 8/04029* (2013.01); *H01M 8/04037* (2013.01); *H01M 8/04052* (2013.01); *H01M 8/04302* (2016.02); *H01M 8/04358* (2013.01); *H01M 8/04417* (2013.01); *H01M 8/04723* (2013.01); *H01M 8/04738* (2013.01); *H01M 8/04768* (2013.01); *H01M 2008/1095* (2013.01); *H01M 2250/20* (2013.01); *Y02T 90/40* (2013.01)

(58) Field of Classification Search
CPC .......... B60L 53/54; B60L 58/32; B60L 58/33; B60L 58/34; H01M 8/04007; H01M 8/04029; H01M 8/04037; H01M 8/04052; H01M 8/04067; H01M 8/04225; H01M 8/04302; H01M 8/04358; H01M 8/04417; H01M 8/04723; H01M 8/04738; H01M 8/04768; H01M 2008/1095; H01M 2250/20; Y02E 60/50; Y02T 90/40

See application file for complete search history.

(56) References Cited

U.S. PATENT DOCUMENTS

| | | | | |
|---|---|---|---|---|
| 6,493,507 | B2 * | 12/2002 | Salyer | .................. F24H 7/0433 |
| | | | | 392/341 |
| 9,522,609 | B2 | 12/2016 | Lee et al. | |
| 2015/0183338 | A1 | 7/2015 | Lee et al. | |

FOREIGN PATENT DOCUMENTS

| | | |
|---|---|---|
| CN | 104752745 A | 7/2015 |
| CN | 104883758 A | 9/2015 |
| CN | 105222345 A | 1/2016 |
| JP | 2004-247096 A | 9/2004 |

OTHER PUBLICATIONS

Machine translation of the abstractor JP 2004-247096, published on Sep. 2, 2004 (Year: 2004).*
Machine translation of the description of JP 2004-247096, published on Sep. 2, 2004 (Year: 2004).*
Machine translation of CN 105222345, published on Jan. 6, 2016 (Year: 2016).*
Machine translation of CN 104883758, published on Sep. 2, 2015 (Year: 2015).*
Chinese Office Action dated Oct. 21, 2020 from the corresponding Chinese Application No. 201710061446.9, 19 pp.

* cited by examiner

*Primary Examiner* — Anca Eoff

(57) ABSTRACT

A thermal management system for a fuel cell vehicle includes a first line including a coolant pump and a fuel cell stack, a second line including a coolant heater and a phase change material (PCM) and connected to the first line to form a first loop in which the coolant pump, the stack, the coolant heater, and the PCM are arranged, a third line including a radiator and connected to the first line to form a second loop in which the coolant pump, the stack, and the radiator are arranged, and an opening and closing valve opening and closing each of the first line, the second line, and the third line to allow the coolant to circulate in at least one of the first loop and the second loop, wherein the PCM is configured to be heat-exchanged with the coolant heater and the coolant.

9 Claims, 14 Drawing Sheets

THERMAL MANAGEMENT SYSTEM FOR FUEL CELL VEHICLE AND CONTROL METHOD THEREOF

CROSS-REFERENCE TO RELATED APPLICATION

This application is based on and claims the benefit of priority to Korean Patent Application No. 10-2016-0140404, filed on Oct. 26, 2016 in the Korean Intellectual Property Office, the disclosure of which is incorporated herein in its entirety by reference.

TECHNICAL FIELD

The present disclosure relates to a thermal management system for a fuel cell vehicle and a control method thereof.

BACKGROUND

A fuel cell is a sort of electric generation device converting chemical energy of fuel into electrical energy through electrochemical reaction within a fuel cell stack, rather than changing the chemical energy into heat through combustion. Fuel cells may be used to supply power for small electric/electronic products, in particular, portable devices, as well as power for industrial purposes, power for household purposes, and power for driving vehicles.

As an example of a fuel cell, a polymer electrolyte membrane fuel cell or proton exchange membrane fuel cell (PEMFC), which has been researched as a power source for driving a vehicle includes a membrane electrode assembly (MEA) in which catalytic electrode layers where an electrochemical reaction occurs are attached to opposing sides of an electrolyte membrane where hydrogen ions moves, a gas diffusion layer (GDL) evenly distributing reaction gases and transferring electric energy, a gasket and clamping mechanism for maintaining airtightness of reaction gases and a coolant and an appropriate compression, and a bipolar plate allowing the reaction gases and the coolant to move.

In the fuel cell, hydrogen as a fuel and oxygen (air) as an oxidizing agent are supplied to an anode and a cathode of the MEA, respectively, through a flow channel of the bipolar plate, and here, hydrogen is supplied to an anode and oxygen (air) is supplied to a cathode.

Hydrogen supplied to the anode is decomposed to hydrogen ions (proton) ($H^+$) and electrons ($e-$), and only the hydrogen ions selectively pass through the electrolyte membrane, a cation-exchanged membrane, and are transferred to the cathode while electrons are transferred to the cathode through the GDL and the bipolar plate, as conductors.

In the cathode, a reaction that hydrogen ions supplied through the electrolyte membrane and electrons transferred through the bipolar plate meet oxygen in the air supplied to the cathode by an air supply device to generate water takes place. Here, the movement of the hydrogen ions results in a flow of electrons through an external conducting wire to generate a current.

A fuel cell system installed in a vehicle includes a fuel cell stack generating electric energy, a fuel supply device supplying a fuel (hydrogen) to the fuel cell stack, an air supply device supplying oxygen in the air, an oxidizing agent, required for an electrochemical reaction to the fuel cell stack, and a thermal management system (TMS) removing reaction of the fuel cell stack to outside of the system and controlling an operation temperature of the fuel cell stack.

Through this configuration, in the fuel cell system, electricity is generated by an electrochemical reaction based on hydrogen as a fuel and oxygen in the air and heat and water are discharged as reaction byproducts.

In the fuel cell system, in particular, heat is generated as a reaction byproduct, and thus, a cooling device cooling the stack is essential in order to prevent an increase in temperature of the stack. Also, the most urgent but difficult issue of the fuel cell system is a strategy of securing cold-start performance, and thus, a role of the thermal management system is crucial.

A coolant of a thermal management system (TMS) line serves as a cold medium cooling a stack and also as a heat medium for rapidly thawing a stack as it is rapidly heated by a heater and supplied to the stack at the time of cold starting.

Here, however, the fuel cell system requires a long period of time for cold-starting, degrading drivers' convenience.

Also, the related art fuel cell system has a complicated loop of a coolant to secure cold-starting performance and has a large number of valves installed in the loop, leading to a structure of the system that is complicated, is weighty, and has high installation cost.

In addition, in the related art fuel cell system, a time for a coolant to have a high temperature to reach a predetermined coolant temperature limit value is so short that an output of a stack is lowered.

The disclosure of this section is to provide background of the invention. Applicant notes that this section may contain information available before this application. However, by providing this section, Applicant does not admit that any information contained in this section constitutes prior art.

SUMMARY

The present disclosure has been made to solve the above-mentioned challenges while advantages achieved by the related art fuel cell system are maintained intact.

An aspect of the present disclosure provides a thermal management system for a fuel cell vehicle, having a structure improved to have high cold-starting performance, and a control method thereof.

Another aspect of the present disclosure provides a thermal management system for a fuel cell vehicle, having a structure improved to lengthen a time for a temperature of a coolant to reach a coolant temperature limit value, and a control method thereof.

Another aspect of the present disclosure provides a thermal management system for a fuel cell vehicle, having a structure improved to simplify a loop of a coolant, and a control method thereof.

Another aspect of the present disclosure provides a thermal management system for a fuel cell vehicle, having a structure improved to minimize the number of valves installed in a loop of a coolant, and a control method thereof.

According to an embodiment of the present disclosure, a thermal management system for a fuel cell vehicle includes: a first line including a coolant pump and a fuel cell stack; a second line including a coolant heater and a phase change material (PCM) and connected to the first line to form a first loop in which the coolant pump, the stack, the coolant heater, and the PCM are arranged; a third line including a radiator and connected to the first line to form a second loop in which the coolant pump, the stack, and the radiator are arranged; and an opening and closing valve opening and closing each of the first line, the second line, and the third line to allow the coolant to circulate in at least one of the first loop and the second loop, wherein the PCM is configured to be heat-exchanged with the coolant heater and the coolant.

The coolant heater may have a heater housing configured to allow the coolant to pass therethrough and a heater core installed within the heater housing and heating the coolant, and the PCM may be installed within the heater housing and may be in contact with the coolant.

The coolant heater may further have a heat pipe installed within the housing and thermally connect the heater core and the PCM.

The coolant heater may have at least one heater core disposed on the basis of the second line, and the PCM may be installed to surround at least a portion of the heater core and the second line.

The coolant heater may further have a metal coil wound around the heater core and an outer circumferential portion of the second line to thermally connect the heater core and the second line.

The PCM may have a phase change temperature lower than a predetermined coolant temperature limit value.

According to another embodiment of the present disclosure, a control method of the thermal management system for a fuel cell vehicle as described above includes: (a) when a vehicle is started in a state in which the coolant has a temperature lower than a predetermined cold-start temperature, actuating the coolant heater using electric power output from the stack and storing heat output from the coolant heater in the PCM; and (b) when a temperature of the PCM is increased to the phase change temperature or higher, circulating the coolant in the first loop using the coolant pump and the opening and closing valve, after operation (a).

The control method may further include: (c) when the stack is actuated in a predetermined normal state, circulating the coolant in the first loop and the second loop in a predetermined distribution ratio using the coolant pump and the opening and closing valve, after operation (b).

The control method may further include: (d) when the stack is actuated in a predetermined high output state, circulating the coolant in the second loop using the coolant pump and the opening and closing pump, after operation (b); and (e) when a temperature of the coolant reaches a predetermined coolant temperature limit value, circulating the coolant in the first loop and the second loop in a predetermined distribution ratio using the coolant pump and the opening and closing valve, after operation (d), wherein the phase change temperature of the PCM is lower than the coolant temperature limit value.

When operation (d) is performed, the coolant pump may be actuated with a predetermined maximum output.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
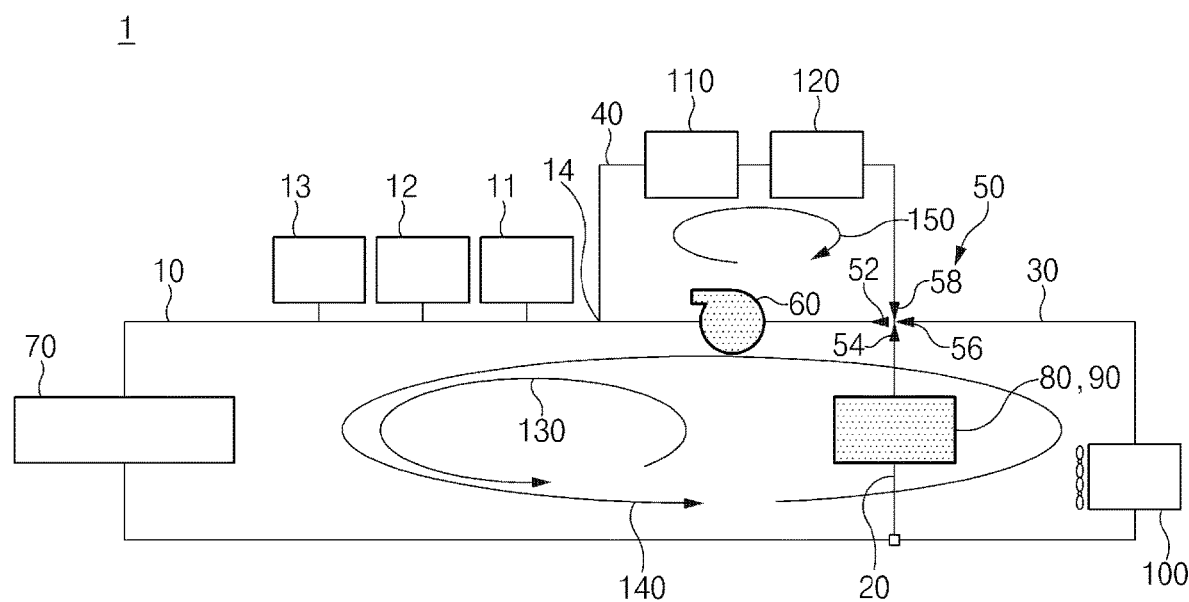
FIG. 1 is a conceptual view of a thermal management system for a fuel cell vehicle according to a first embodiment of the present disclosure.

It should be appreciated that terms or words used in the specification and claims should not be limited and construed as common or dictionary meanings, and should be construed as meanings and concepts according to the technical spirit of the present disclosure based on the principle that the inventor can appropriately define the concept of each term for describing the present disclosure in the best way. The embodiment described in the present disclosure and the configuration illustrated in the drawings are merely the most preferred embodiment of the present disclosure, rather than representing all the technical concepts of the present disclosure, so the present disclosure is meant to cover all modifications, similarities and alternatives which are included in the spirit and scope of the present disclosure at the time of filing of the present disclosure.

A size of each component or a specific part forming each component shown in the drawings are exaggerated, excluded or simplified for the convenience of understanding and clarity. Therefore, the size of each component may not fully reflect an actual size. Also, any explanation of the prior art known to relate to the present invention may be omitted if it is regarded to render the subject matter of the present invention vague.

FIG. 1 is a conceptual view of a thermal management system for a fuel cell vehicle according to a first embodiment of the present disclosure.

Referring to FIG. 1, a thermal management system 1 according to the first embodiment of the present disclosure may include a first line 10 to a fourth line 40 connected and disconnected to form a first loop 130 to a third loop 150 in which a coolant circulates, and an opening and closing valve 50 opening and closing the first line 10 to fourth line 40.

The first line 10 may include a coolant pump 60 pumping a coolant and a fuel cell stack 70 (hereinafter, referred to as a "stack 70") generating electricity. One end of the first line 10 is connected to a first port 52 of the opening and closing valve 50 (to be described hereinafter). The other end of the first line 10 is connected to one end of the second line 20 (to be described hereinafter). The coolant pump 60 and the stack 70 are disposed such that a coolant pumped by the coolant pump 60 is introduced to the stack 70. Also, preferably, a temperature sensor 11 measuring a temperature of a coolant, a pressure sensor 12 measuring pressure of a coolant, and a conductivity sensor 13 measuring conductivity of a coolant are installed between the coolant pump 60 and the stack 70, but the present invention is not limited thereto.

The second line 20 may include a coolant heater 80 heating a coolant and a phase change material (PCM) 90 storing heat transferred from the coolant heater 80 or a coolant or transferring stored heat to a coolant. The coolant heater 80 is preferably a cathode oxygen depletion (COD) integrated heater, but the present disclosure is not limited thereto. One end of the second line 20 is connected to one end of the first line 10, and the other end of the second line 20 is connected to a second port 54 (to be described hereinafter) of the opening and closing valve 50. When the second line 20 is installed in this manner, the first loop 130 in which the coolant pump 60, the stack 70, the coolant heater 80, and the PCM 90 are arranged is formed as illustrated FIG. 1.

TABLE 1

|  | First Loop (130) | Second Loop (140) | Third Loop (150) |
|---|---|---|---|
| Temperature Sensor (11) | X | X |  |
| Pressure Sensor (12) | X | X |  |
| Conductivity Sensor (13) | X | X |  |
| Coolant Pump (60) | X | X | X |
| Fuel Cell Stack (70) | X | X |  |
| Coolant Heater (80) | X |  |  |
| PCM (90) | X |  |  |
| Radiator (100) |  | X |  |
| Vehicle Cabin Heater (110) |  |  | X |
| Ion Filter (120) |  |  | X |

Table 1 indicates the components that are connected by the respective loops in FIG. 1.

Figure 2A:
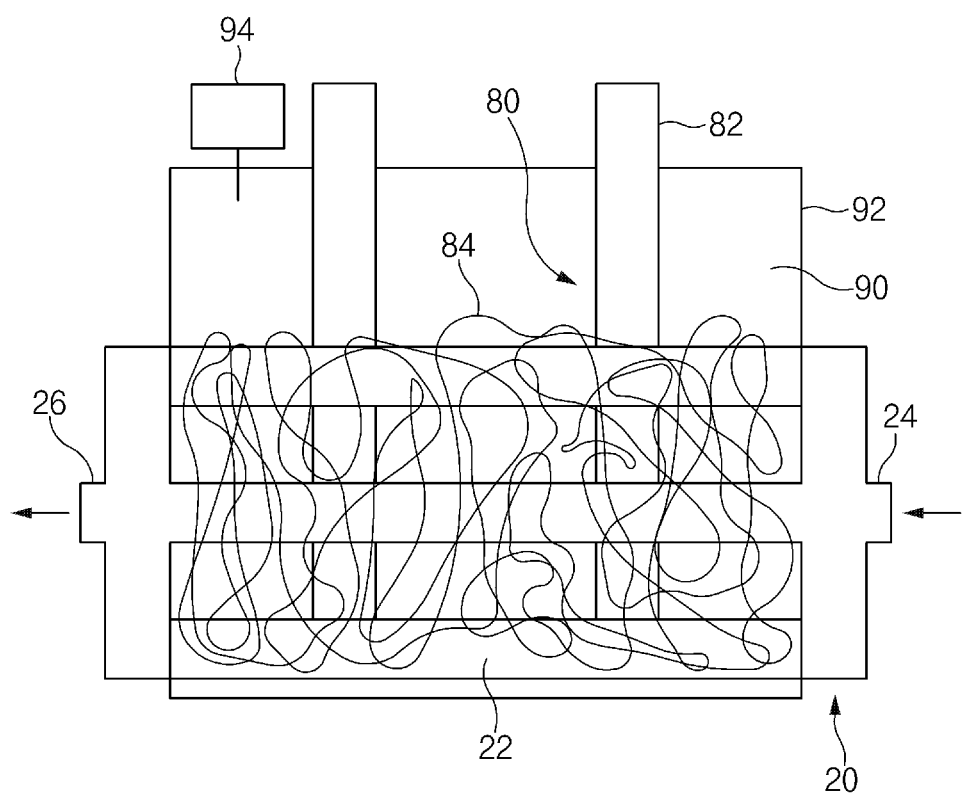
FIGS. 2A and 2B are views illustrating a method for coupling a coolant heater and a phase change material (PCM) illustrated in FIG. 1.
Figure 2B:
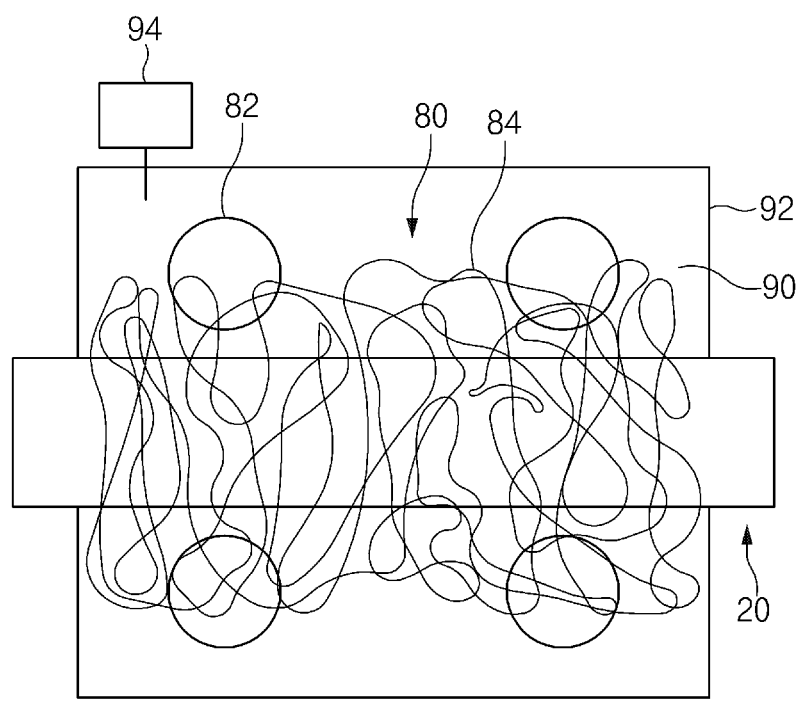
Figure 3:
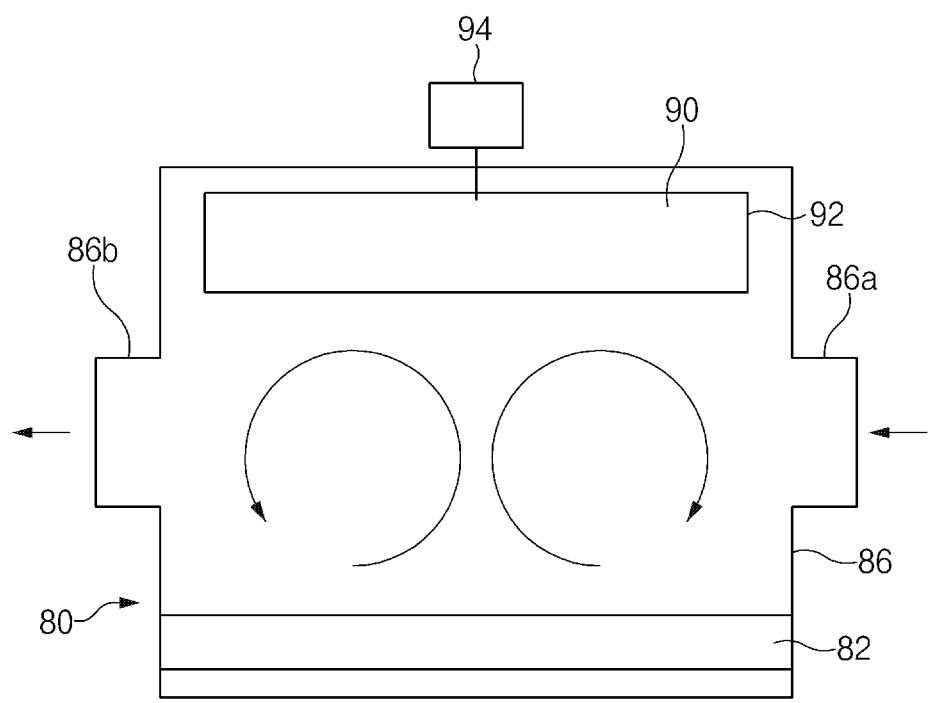
FIG. 3 is a view illustrating another method for coupling a coolant heater and a PCM illustrated in FIG. 1.
Figure 4A:
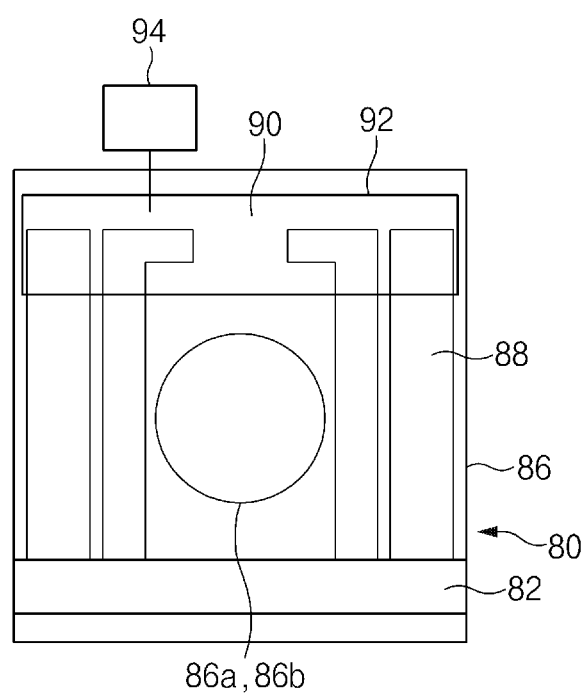
FIGS. 4A and 4B are views illustrating another method for coupling a coolant heater and a PCM illustrated in FIG. 1.
Figure 4B:
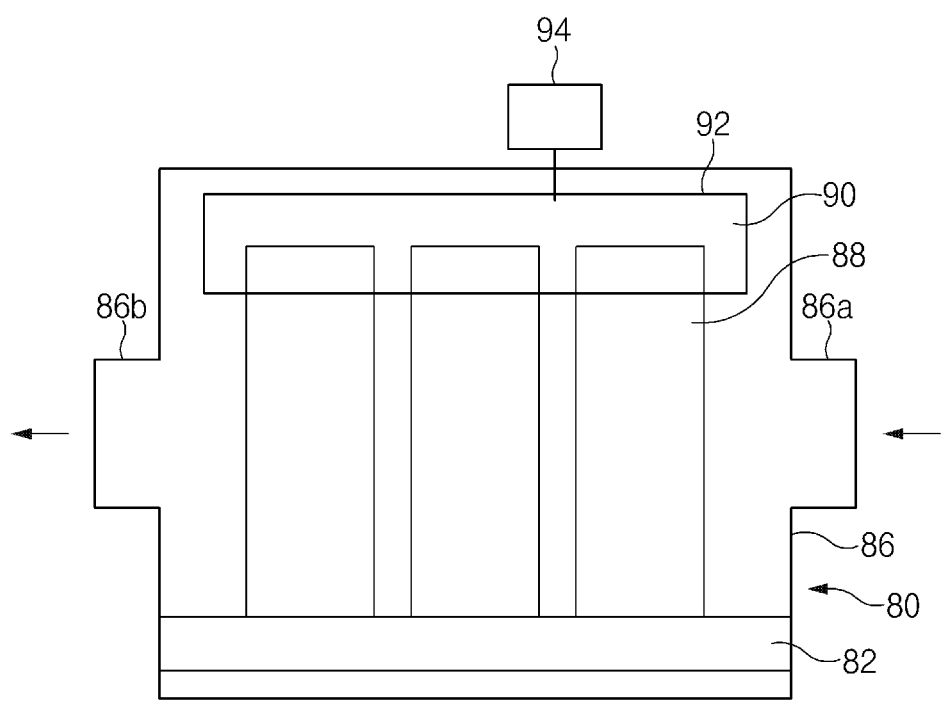

FIGS. 2A and 2B are views illustrating a method for coupling the coolant heater 80 and the PCM 90 illustrated in FIG. 1 and, FIG. 3 is a view illustrating another method for coupling the coolant heater 80 and the PCM 90 illustrated in FIG. 1, and FIGS. 4A and 4B are views illustrating another method for coupling the coolant heater 80 and the PCM 90 illustrated in FIG. 1.

The PCM 90 is installed to be heat-exchanged with a coolant passing through the coolant heater 80 and the second line 20.

For example, as illustrated in FIGS. 2A and 2B, the coolant heater 80 may include a plurality of heater cores 82 disposed on the basis of the second line 20 and a metal coil 84 thermally connecting the heater cores 82 to the second line 20 and the PCM 90. The PCM 90 may be provided to surround the coolant heater 80 and the second line 20.

The heater cores 82 may be disposed at a predetermined interval such that the second line 20 is positioned between the heater cores 82. The heater cores 82 may be actuated by electric power supplied from the stack 70 and an external power source. The metal coil 84 is wound around the heater cores 82 and an outer circumferential portion of the second line 20 in order to thermally connect the heater cores 82 and the second line 20. The metal coil 84 is not particularly limited in material and may be formed of a material having high thermal conductivity. The metal coil 84 may accelerate heat exchange between coolants that pass through the heater core 82, the PCM 90, and the second line 20.

The PCM 90 is provided to surround at least a portion of the heater core 82, the metal coil 84, and the second line 20. For example, a PCM pack 92 is installed such that at least a portion of the heater core 82, the metal coil 84, and the second line 20 is positioned therein, and the inside of the PCM pack 92 may be charged with the PCM 90. Then, even a gap formed between the heater core 82, the metal coil 84, and the second line 20 may also be charged with the PCM 90. As illustrated in FIG. 2A, a temperature sensor 94 measuring a temperature of the PCM 90 may be installed in the PCM 90.

Latent heat refers to heat absorbed or released when a certain material is changed in phase, that is, changed from a solid to a liquid (or from a liquid to a solid) or from a liquid to a gas (or from a gas to a liquid). Latent heat is considerably large, relatively to sensible heat, i.e., heat absorbed or released according to a change in temperature in a state in which a phase change does not made.

The PCM is a material used for the purpose of storing energy or uniformly maintaining a temperature using heat absorption or heat release effect of latent heat. Since a temperature of a phase change, latent heat, and the like, of the PCM are unique characteristics of a material, and thus, an appropriate PCM is selected according to a usage purpose or a usage environment. Thus, a PCM to be used as the PCM 90 is selected in consideration of a usage purpose or a usage environment of the PCM 90.

Since the PCM 90 is installed to be heat-exchanged with each of the coolant heater 80 and a coolant, the PCM 90 is preferably configured as a PCM able to maintain a temperature of a coolant at a temperature appropriate for driving the stack 70. For example, the PCM 90 may be configured as a PCM having a phase change temperature lower than a predetermined coolant temperature limit value. Specific examples of the PCM available to be used as the PCM 90 is shown in Table 2.

TABLE 2

| Name | Melting point (° C.) | Latent heat (KJ/Kg) | Density of liquid phase (Kg/m$^3$) | Specific heat of liquid phase (KJ/Kg° C.) | Specific heat of solid phase (KJ/Kg° C.) |
|---|---|---|---|---|---|
| Sorbitan fatty acid ester | 64~68 | 38.5 | 1003.4 | 4.548 | 6.163 |
| Stearic acid | 70 | 327.1 | 794.2 | 3.92 | 3.19 |
| Cetearyl alcohol | 65 | 217.8 | 861.94 | 7.163 | 6.997 |
| Butyl paraben | 67~70 | 576.9 | 1059.14 | 7.235 | 3.414 |
| Butyl-methoxydi-benzoyl-methane | 81~84 | 140 | 1101.44 | 7.426 | 1.74 |
| Carnauba wax | 81~86 | 566.8 | 819.34 | 10.842 | 2.421 |

The PCM 90 may be heat-exchanged with a coolant in the process of passing through the heater core 82 and the second line 20. For example, the PCM 90 may receive heat released from the heater core 82, receive heat of a coolant passing through the second line 20, or receive heat stored in a coolant in the process of passing through the second line 20.

As illustrated in FIG. 2A, the second line 20 may include a plurality of branch pipes 22 configured to penetrate through an internal space of the PCM pack 92, an inlet port 24 transferring a coolant in the process of passing through the second line 20 to the branch pipes 22, and an outlet port 26 re-transferring a coolant which has passed through the branch pipes 22 to the second line 20. The heater core 82, the metal core 84, and the PCM 90 may be installed to be heat-exchanged with the branch pipes 22. When the branch pipes 22 prepared in this manner, a surface area of the second line 20 heat-exchanged with the heater core 82, the metal coil 84, and the PCM 90 is increased to accelerate heat exchange between the heater core 82, the metal coil 84, the second line 20, and the PCM 90.

For example, as illustrated in FIG. 3, the coolant heater 80 may include a heater housing 86 configured to allow a coolant to pass therethrough and a heater core 82 installed within the heater housing 86 and heating a coolant passing through the heater housing 86. The PCM 90 may be installed within the heater housing 86.

The heater housing 86 may have an inlet 86*a* and an outlet 86*b* connected to the second line 20. Then, a coolant in the process of passing through the second line 20 may be introduced to the housing 86 through the inlet 86*a*, heat-exchanged with the heater core 82 and the PCM 90, and subsequently re-introduced to the second line 20 through the outlet 86*b*. The heater core 82 is installed in an internal space of the heater housing 86 to heat a coolant passing through the heater housing 86.

The PCM 90 is installed within the heater housing 86 such that it may be in thermally contact with a coolant passing through the heater housing 86. For example, the PCM 90 may be charged within the PCM pack 92, and the PCM pack 92 may be installed within the heater housing 86. The PCM 90 may then be directly heat-exchanged with a coolant passing through the heater housing 86. Also, the PCM 90 may be indirectly heat-exchanged with the heater core 82 by the medium of a coolant passing through the heater housing 86. That is, heat generated in the heater core 82 is transferred to the PCM 90 due to natural convection of the coolant formed within the heater housing 86.

For example, as illustrated in FIGS. 4A and 4B, the coolant heater 80 may include the heater housing 86 configured to allow a coolant to pass therethrough, the heater core 82 installed within the heater housing 86 and heating a coolant passing through the heater housing 86, and a heat pipe 88 thermally connecting the heater core 82 and the PCM 90. The PCM 90 may be installed within the heater housing 86.

The heat pipe 88 may be installed within the heater housing such that one end thereof is thermally connected to the heater core 82 and the other end is thermally connected to the PCM 90. An installation number of the heat pipe 88 is not particularly limited and at least one heat pipe 88 may be installed at a predetermined interval. The heat pipe 88 may accelerate heat exchange between the heater core 82 and the PCM, compared with a case in which the heater core 82 and the PCM 90 are thermally directly connected to transfer heat from the heater core 82 to the PCM 90 by the medium of a coolant.

The third line 30 may have a radiator 100 outwardly dissipating heat transferred from a coolant. One end of the third line 30 is connected to the other end of the first line 10 and one end of the second line 20, and the other end of the fourth line 40 is connected to a third port 56 of the opening and closing valve 60 (to be described hereinafter). When the third line 30 is installed in this manner, the second loop 140 in which the coolant pump 60, the stack 70, and the radiator 100 are arranged is formed.

The fourth line 40 may have a heater 110 heating an indoor space of a vehicle using heat transferred from a coolant and an ion filter 120 removing ions included in a coolant. One end of the fourth line 40 is connected to a specific point 14 of the first line 10 positioned between the coolant pump 60 and the stack 70, and the other end of the fourth line 40 is connected to a fourth port 58 of the opening and closing valve 60 (to be described hereinafter). When the fourth line 40 is installed in this manner, the third loop 150 in which the coolant pump 60, the heater 110, and the ion filter 120 are arranged is formed.

The opening and closing valve 50 may have a first port 52 connected to one end of the first line 10, a second port 54 connected to the other end of the second line 20, a third port 56 connected to the other end of the third line 30, and a fourth port 58 connected to the other end of the fourth line 40. A type of valve that may be used as the opening and closing valve 50 is not particularly limited and the opening and closing valve 50 may be configured as a generally used 4-way valve. As illustrated in FIG. 1, the opening and closing valve 50 may selectively open and close the first port 52 to the fourth port 58 to cause a coolant pumped by the coolant pump 60 to circulate in at least one of the first loop 130 to the third loop 150.

The various sensors described above may transfer sensing information to a controller of a vehicle, and the controller of the vehicle may control various members included in the thermal management system 1 for a fuel cell vehicle, such as the coolant pump 60, the stack 70, the coolant heater 80, the radiator 100, the heater 110, the opening and closing valve 50, and the like.

Hereinafter, a control method of the thermal management system 1 for a fuel cell vehicle according to a first embodiment of the present disclosure will be described with reference to FIG. 5.

Figure 5:
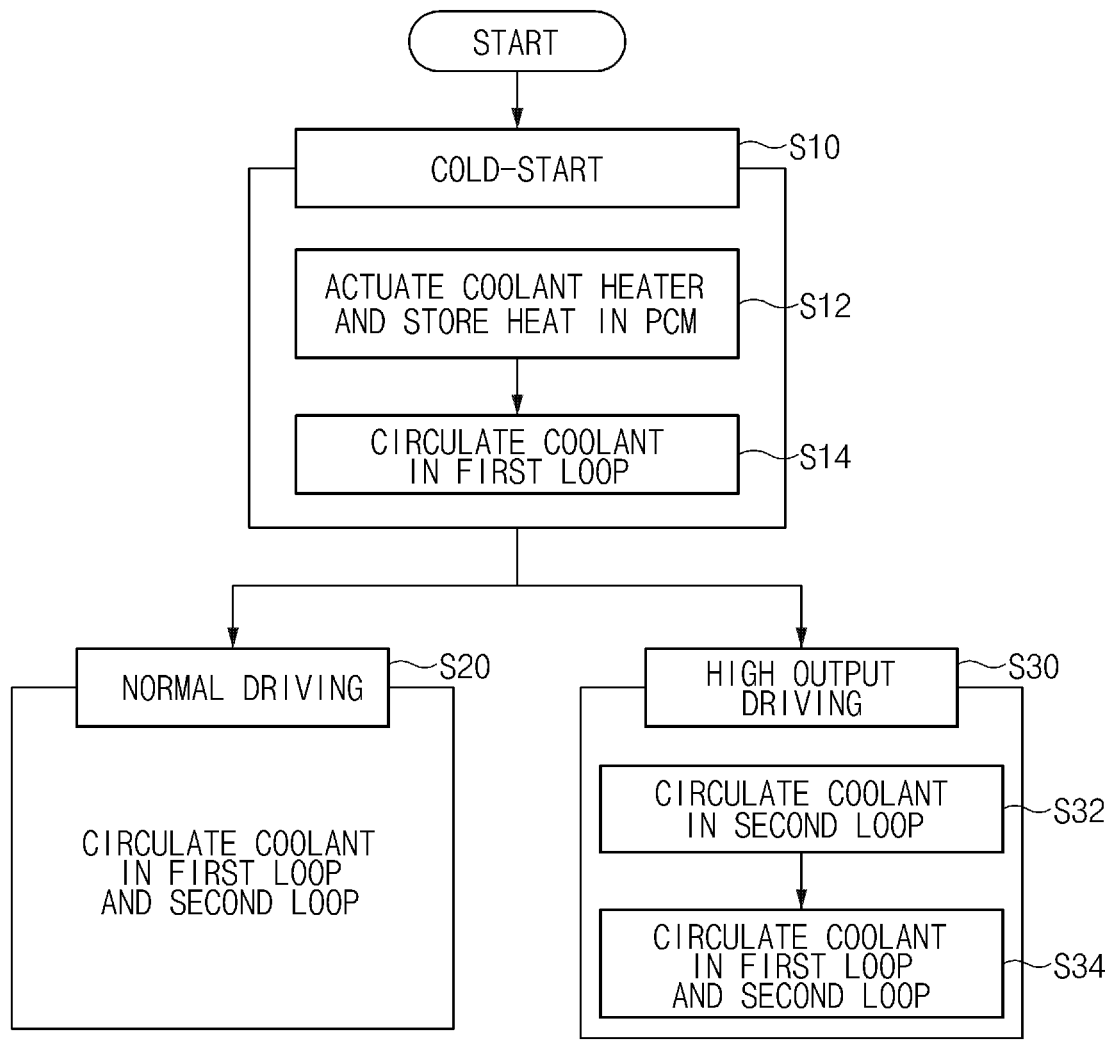
FIG. 5 is a flow chart illustrating a control method of the thermal management system illustrated in FIG. 1.

As illustrated in FIG. 5, the control method of the thermal management system 1 for a fuel cell vehicle according to a first embodiment of the present disclosure may include a cold-starting operation S10, a normal driving operation S20, and a high output driving operation S30.

First, the cold-starting operation S10 may include an operation S12 of actuating the coolant heater 80 using electric power output from the stack 70 and storing heat output from the coolant heater 80 in the PCM 90, and an operation S14 of circulating a coolant in the first loop 130 using the coolant pump 60 and the opening and closing valve 50 when a temperature of the PCM 90 is increased to a phase change temperature or higher, after the operation S12.

The operation S12 may be performed when the stack 70 starts in a case in which a temperature of a coolant measured by the temperature sensor 11 is lower than a cold-start temperature. In operation S12, in a state in which actuation of the coolant pump 60 is stopped and a coolant is not circulated in the first loop 130 to the third loop 150, the stack 70 is actuated and the coolant heater 80 is actuated using electric power output from the stack 70. The stack 70 then is increased in temperature due to heat generated in the stack 70 and the PCM 90 stores heat generated by the coolant heater 80.

The operation S14 may be performed when a temperature of the PCM 90 measured by the temperature sensor 94 is increased to a phase change temperature or higher. In operation S14, the coolant pump 60 is actuated to pump a coolant and the opening and closing valve 50 is actuated to circulate a coolant in the first loop 130. Then, the heat stored in the PCM 90 in operation S12 is transferred to a coolant passing through the second line 20 and the coolant having a temperature increased by the PCM 90 is transferred to the stack 70 through the first line 10. That is, heat stored in the PCM 90 is transferred to the stack 70 by the medium of a coolant. Thus, the thermal management system 1 for a fuel cell vehicle according to the first embodiment of the present disclosure may reduce time required for cold-starting of the stack 70, compared with a case in which cold-starting is performed using only heat generated by the stack 70 itself.

Thereafter, the normal driving operation S20 may be performed when the stack 70 is actuated in a predetermined normal state after cold-starting is completed. In the normal driving operation S20, the coolant pump 60 is actuated to pump a coolant and the opening and closing valve 50 is actuated to circulate a coolant in the first loop 130 and the second loop 140 in a predetermined distribution ratio. Here, the distribution ratio of the coolant is not particularly limited and may be selectively adjusted according to a state of the stack 70.

Thereafter, the high output driving operation S30 may be performed when the stack 70 is actuated in a predetermined high output state after cold-starting is completed. The high output driving operation S30 may be performed after cold-starting is completed, and include operation S32 of circulating a coolant in the second loop 140 using the coolant pump 60 and the opening and closing valve 50 when the stack 70 is actuated in the predetermined high output state and operation S34 of circulating a coolant in the first loop 130 and the second loop 140 at a predetermined distribution ratio using the coolant pump 60 and the opening and closing valve 50 when a temperature of the coolant reaches a predetermined coolant temperature limit value, after the operation S32.

The operation S32 may be performed when the stack 70 is actuated in a high output state but a temperature of the coolant does not reach the coolant temperature limit value yet. In operation S32, the coolant pump 60 is actuated with a maximum output and the opening and closing valve 50 is actuated to circulate a coolant only in the second loop 140. In a case in which a temperature of the coolant does not reach the coolant temperature limit value yet, the PCM 90 is not able to effectively store heat from a coolant, and thus, a coolant is concentratedly supplied only to the radiator 100 in a state in which the pump 60 is actuated with a maximum output to maximize heat dissipation by the radiator 100.

The operation S34 may be performed when the stack 70 is actuated in a high output state and a temperature of a coolant reaches the coolant temperature limit value. In operation S34, the coolant pump 60 is actuated and the opening and closing valve 50 is also actuated to circulate a coolant in the first loop 130 and the second loop 140 in a predetermined distribution ratio. In operation S34, a coolant is not introduced to the second line 20, and thus, the PCM 90 is cooled to a temperature below a phase change temperature. In this state, when a coolant having a temperature increased to the coolant temperature limit value is introduced to the second line 20, a coolant passing through the second line 20 is cooled to the phase change temperature by the PCM 90. Thus, a temperature of a coolant introduced to the stack 70 is lowered to a temperature below the coolant temperature limit value due to such cooling. Cooling of a coolant using the PCM 90 may continue until a phase change of the PCM 90 is completed as a temperature of the PCM 90 is increased to the phase change temperature or higher. Thus, the thermal management system 1 for a fuel cell vehicle according to the first embodiment of the present disclosure may minimize limitation in an output of the stack 70 due to a high temperature of a coolant, compared with a case in which a coolant is cooled using only the radiator 100.

The control method of the thermal management system 1 for a fuel cell vehicle according to the first embodiment of the present disclosure may further include a regenerative energy recovering operation of actuating the coolant heater 80 using regenerative energy recovered using a motor. The regenerative energy recovering operation may be performed when regenerative energy is not able to be stored in or supplied to an electric/electronic component any longer. In the regenerative energy recovering operation, the coolant pump 60 is actuated, the coolant heater 80 is actuated using regenerative energy, and the opening and closing valve 50 is actuated to circulate a coolant in the first loop 130 and the second loop 140. Then, regenerative energy may be transferred to the stack 70 or may be heat-stored in the PCM 90.

Figure 6:
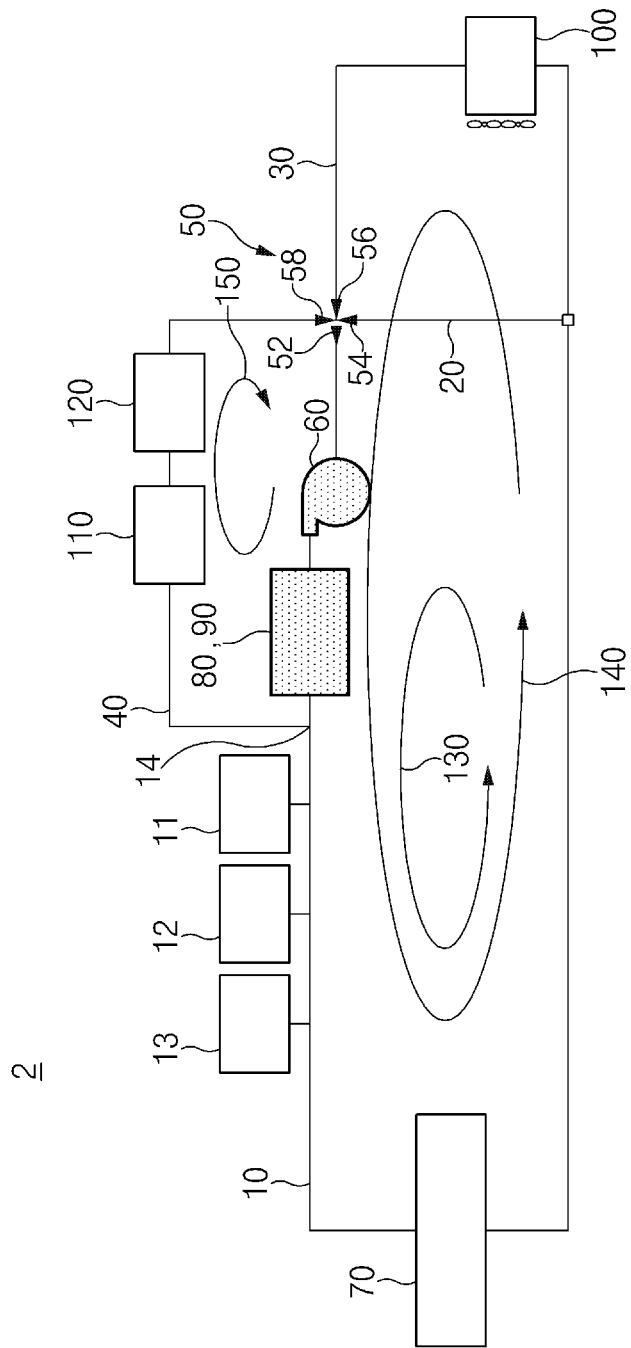
FIG. 6 is a conceptual view of a conceptual view of a thermal management system for a fuel cell vehicle according to a second embodiment of the present disclosure.

FIG. 6 is a conceptual view of a conceptual view of a thermal management system for a fuel cell vehicle according to a second embodiment of the present disclosure.

A thermal management system 2 for a fuel cell vehicle according to the second embodiment of the present disclosure is different to the thermal management system 1 for a fuel cell vehicle according to the first embodiment of the present disclosure, in an installation position of the coolant heater 80 and the PCM 90.

In detail, as illustrated in FIG. 6, the coolant heater 80 and the PCM 90 are installed in the first line 10 such that the coolant heater 80 and the PCM 90 are positioned between the specific point 14 connected to one end of the fourth line 40 and the coolant pump 60. The PCM 90 is installed to be heat-exchanged with each of the coolant heater 80 and a coolant passing through the first line 10.

TABLE 3

|  | First Loop (130) | Second Loop (140) | Third Loop (150) |
| --- | --- | --- | --- |
| Temperature Sensor (11) | X | X |  |
| Pressure Sensor (12) | X | X |  |
| Conductivity Sensor (13) | X | X |  |
| Coolant Pump (60) | X | X | X |
| Fuel Cell Stack (70) | X | X |  |
| Coolant Heater (80) | X | X | X |
| PCM (90) | X | X | X |
| Radiator (100) |  | X |  |
| Vehicle Cabin Heater (110) |  |  | X |
| Ion Filter (120) |  |  | X |

Table 3 indicates the components that are connected by the respective loops in FIG. 6.

Hereinafter, a control method of the thermal management system 2 for a fuel cell vehicle according to the second embodiment of the present disclosure will be described with reference to FIG. 7.

Figure 7:
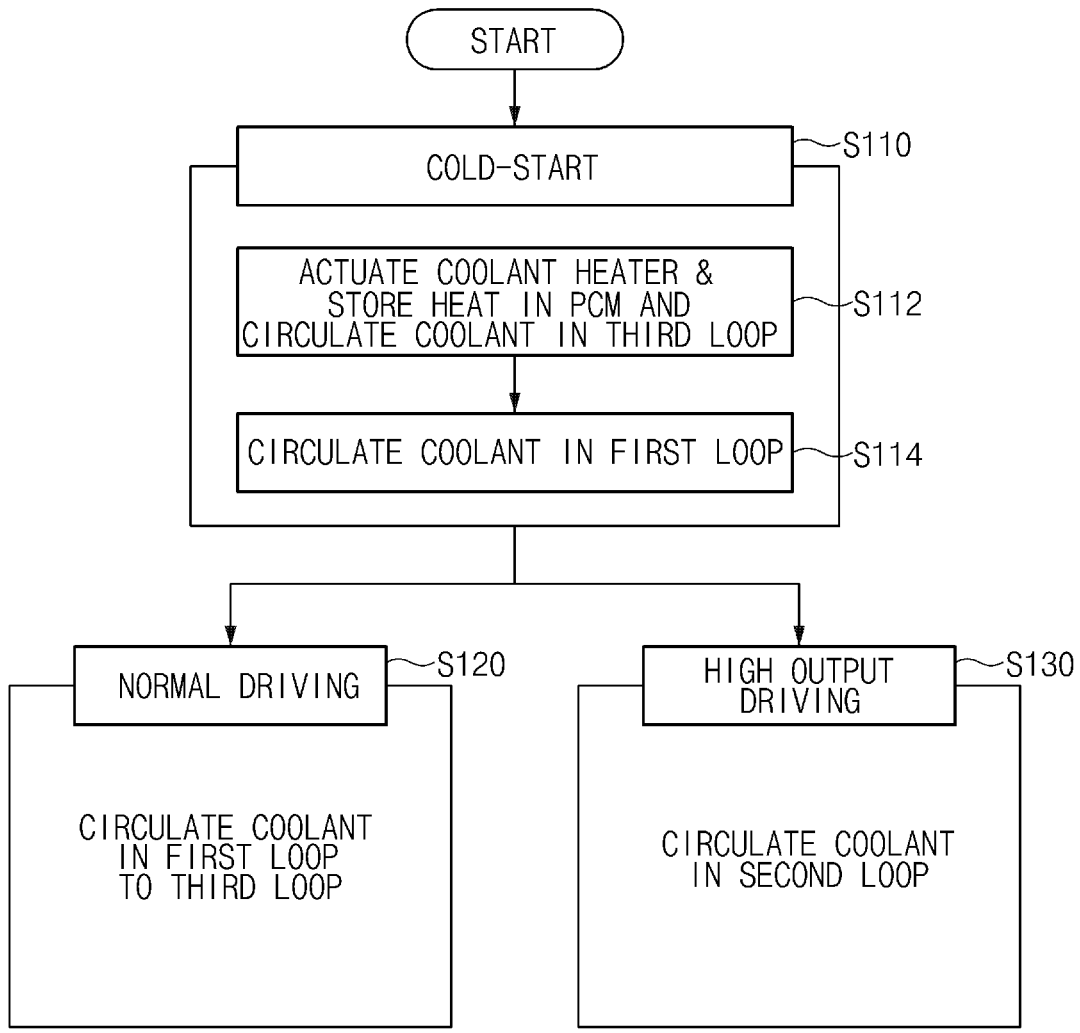
FIG. 7 is a flow chart illustrating a control method of the thermal management system illustrated in FIG. 6.

As illustrated in FIG. 7, the control method of the thermal management system 2 for a fuel cell vehicle according to the second embodiment of the present disclosure may include a cold-starting operation S110, a normal driving operation S120, and a high output driving operation S130.

First, the cold-starting operation S110 may include an operation S112 of actuating the coolant heater 80 using electric power output from the stack 70 and circulating a coolant in the third loop 150 using the coolant pump 60 and the opening and closing valve 50 to store heat output from the coolant heater 80 in the PCM 90 in a case in which the stack 70 is started in a state in which a coolant has a temperature lower than a predetermined cold-start temperature, and an operation S114 of circulating a coolant in the first loop 130 using the coolant pump and the opening and closing valve 50 when a temperature of the PCM 90 is increased to a phase change temperature or higher, after the operation S112.

The operation S112 is preferably performed when the stack 70 is started in a state in which a temperature of a coolant measured by the temperature sensor 11 is lower than a cold-start temperature. The operation S112 is the same as the operation S12 described above, except that a coolant is circulated in the third loop by actuating the coolant pump 60 and the opening and closing valve 50. According to the operation S112, the stack 70 is increased in temperature due to heat generated by the stack 70 itself and the PCM 90 stores heat generated by the coolant heater 80.

The operation S114 is preferably performed in a case in which a temperature of the PCM 90 measured by the temperature sensor 94 is increased to be equal to or higher than a phase change temperature. The operation S114 is the same as the operation S14 described above in that a heat stored in the PCM 90 is transferred to the stack 70 through a coolant circulating in the first loop 130 to reduce a time required for cold-starting.

The normal driving operation S120 may be performed in a case in which the stack 70 is actuated in a predetermined normal state after cold-starting is completed. In the normal driving operation S120, the coolant pump 60 is actuated to pump a coolant and the opening and closing valve 50 is actuated to circulate a coolant in the first loop 130 to the third loop 150 in a predetermined distribution ratio. The distribution ratio of the coolant is not particularly limited and may be selectively adjusted according to a state of the stack 70.

Thereafter, the high output driving operation S130 may be performed in a case in which the stack 70 is actuated in a predetermined high output state after cold-starting is completed. In the high output driving operation S130, the coolant pump 60 is actuated with a maximum output to pump a coolant and the opening and closing valve 50 is actuated to circulate a coolant only in the second loop 140. Then, heat dissipation of the radiator 100 may be maximized and a coolant may be cooled using the PCM 90. Thus, since a timing at which a temperature of a coolant reaches a coolant temperature limit value is delayed to a maximum level, a limitation in an output of the stack 70 due to a high temperature of a coolant may be prevented.

Figure 8:
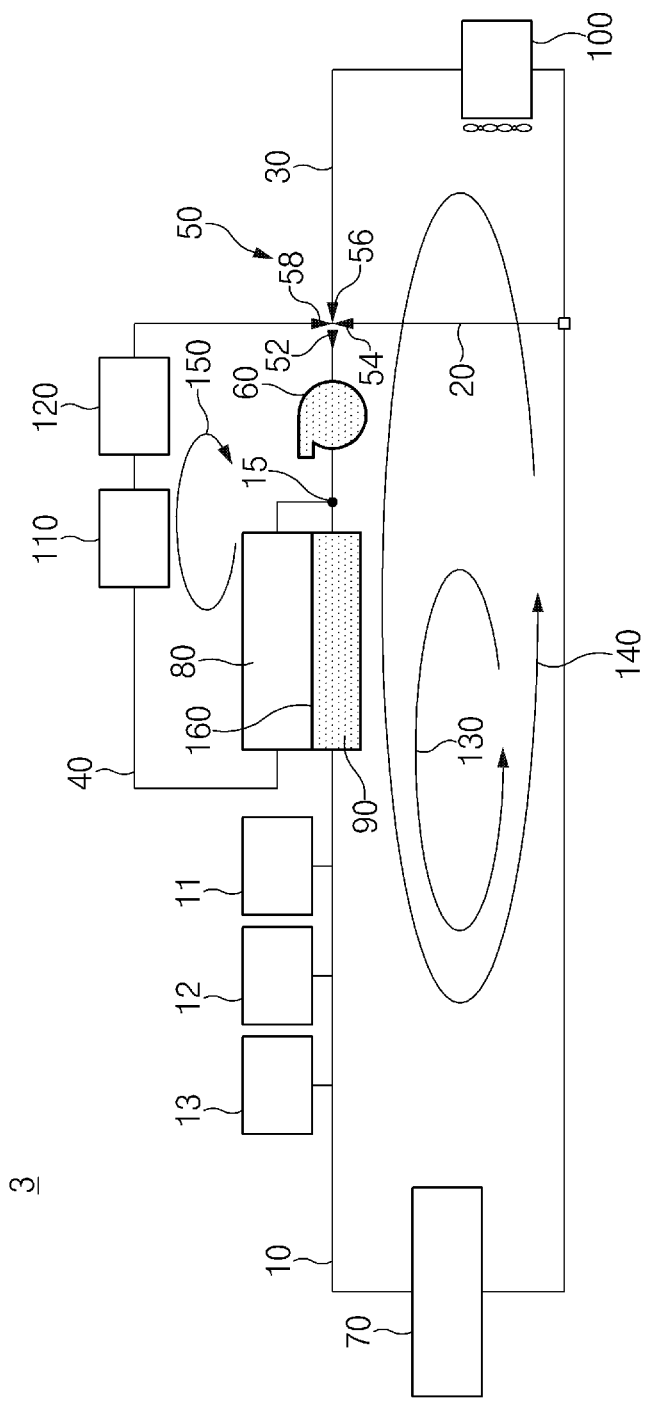
FIG. 8 is a conceptual view of a thermal management system for a fuel cell vehicle according to a third embodiment of the present disclosure.

FIG. 8 is a conceptual view of a thermal management system for a fuel cell vehicle according to a third embodiment of the present disclosure.

Referring to FIG. 8, a thermal management system 3 for a fuel cell vehicle according to the third embodiment of the present disclosure is different to the thermal management system 2 for a fuel cell vehicle according to the second embodiment of the present disclosure, in a coupling relation between the coolant heater 80 and the PCM 90 and an installation structure of the fourth line 40.

In detail, the coolant heater 80 and the PCM 90 are separately provided and thermally connected by a heat exchange member 160. For example, the heat exchange member 160 may be a heat dissipation fin. The first line 10 is provided to pass through the PCM 90. The fourth line 40 is provided such that one end thereof is connected to a specific point 15 of the first line 10 positioned between the coolant pump 60 and the PCM 90 and passes through the coolant heater 80. That is, the first line 10 passes through the PCM 90 and the fourth line 40 passes through the coolant heater 80. Thus, the PCM 90 is heat-exchanged with each of a coolant passing through the coolant heater 80 and the first line 10.

TABLE 4

|  | First Loop (130) | Second Loop (140) | Third Loop (150) |
| --- | --- | --- | --- |
| Temperature Sensor (11) | X | X |  |
| Pressure Sensor (12) | X | X |  |
| Conductivity Sensor (13) | X | X |  |
| Coolant Pump (60) | X | X | X |
| Fuel Cell Stack (70) | X | X |  |
| Coolant Heater (80) |  |  | X |
| PCM (90) | X | X |  |
| Radiator (100) |  | X |  |
| Vehicle Cabin Heater (110) |  |  | X |
| Ion Filter (120) |  |  | X |

Table 4 indicates the components that are connected by the respective loops in FIG. 8.

In the thermal management system 3 for a fuel cell vehicle according to the third embodiment of the present disclosure, since the coolant heater 80 and the PCM 90 are thermally connected by the heat exchange member 160, the thermal management system 3 for a fuel cell vehicle according to the third embodiment of the present disclosure may be controlled in the same manner as that of the thermal management system 2 for a fuel cell vehicle according to the second embodiment of the present disclosure.

Figure 9:
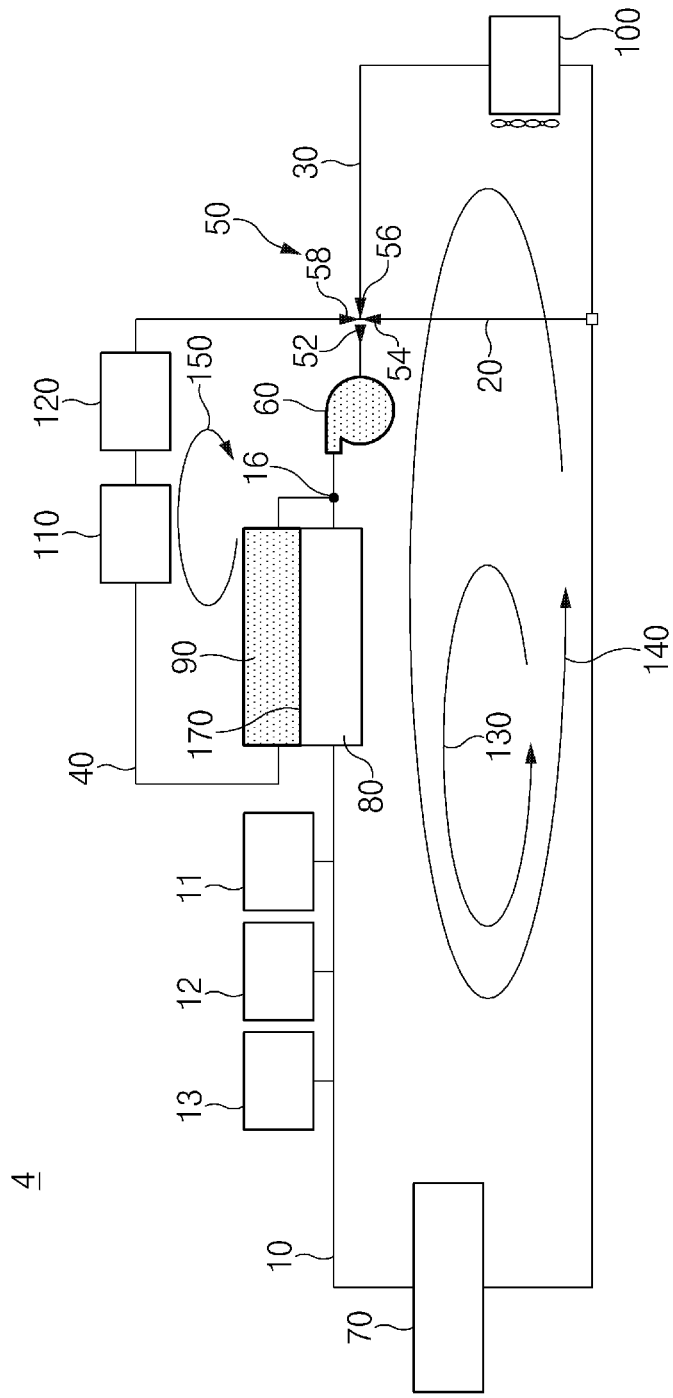
FIG. 9 is a conceptual view of a thermal management system for a fuel cell vehicle according to a fourth embodiment of the present disclosure.

FIG. 9 is a conceptual view of a thermal management system for a fuel cell vehicle according to a fourth embodiment of the present disclosure.

Referring to FIG. 9, a thermal management system 4 for a fuel cell vehicle according to the fourth embodiment of the present disclosure is different to the thermal management system 3 for a fuel cell vehicle according to the third embodiment of the present disclosure described above, in a coupling relation of the coolant heater 80, the PCM 90, the first line 10, and the fourth line 40.

In detail, the coolant heater 80 and the PCM 90 are separately provided and thermally connected by a heat exchange member 170. For example, the heat exchange member 170 may be a heat dissipation fin. The first line 10 is provided to pass through the coolant heater 80. The fourth line 40 is provided such that one end thereof is connected to a specific point 16 of the first line 10 positioned between the coolant pump 60 and the coolant heater 80 and passes through the PCM 90. That is, the fourth line 40 passes through the PCM 90 and the first line 10 passes through the coolant heater 80. Thus, the PCM 90 may be heat-exchanged with each of a coolant passing through the coolant heater 80 and the fourth line 40.

TABLE 5

|  | First Loop (130) | Second Loop (140) | Third Loop (150) |
| --- | --- | --- | --- |
| Temperature Sensor (11) | X | X |  |
| Pressure Sensor (12) | X | X |  |
| Conductivity Sensor (13) | X | X |  |
| Coolant Pump (60) | X | X | X |
| Fuel Cell Stack (70) | X | X |  |
| Coolant Heater (80) | X | X |  |
| PCM (90) |  |  | X |
| Radiator (100) |  | X |  |
| Vehicle Cabin Heater (110) |  |  | X |
| Ion Filter (120) |  |  | X |

Table 5 indicates the components that are connected by the respective loops in FIG. 9.

In the thermal management system 4 for a fuel cell vehicle according to the fourth embodiment of the present disclosure, since the coolant heater 80 and the PCM 90 are thermally connected by the heat exchange member 170, the thermal management system 4 for a fuel cell vehicle according to the fourth embodiment of the present disclosure may be controlled in the same manner as that of the thermal management system 2 for a fuel cell vehicle according to the second embodiment of the present disclosure.

Figure 10:
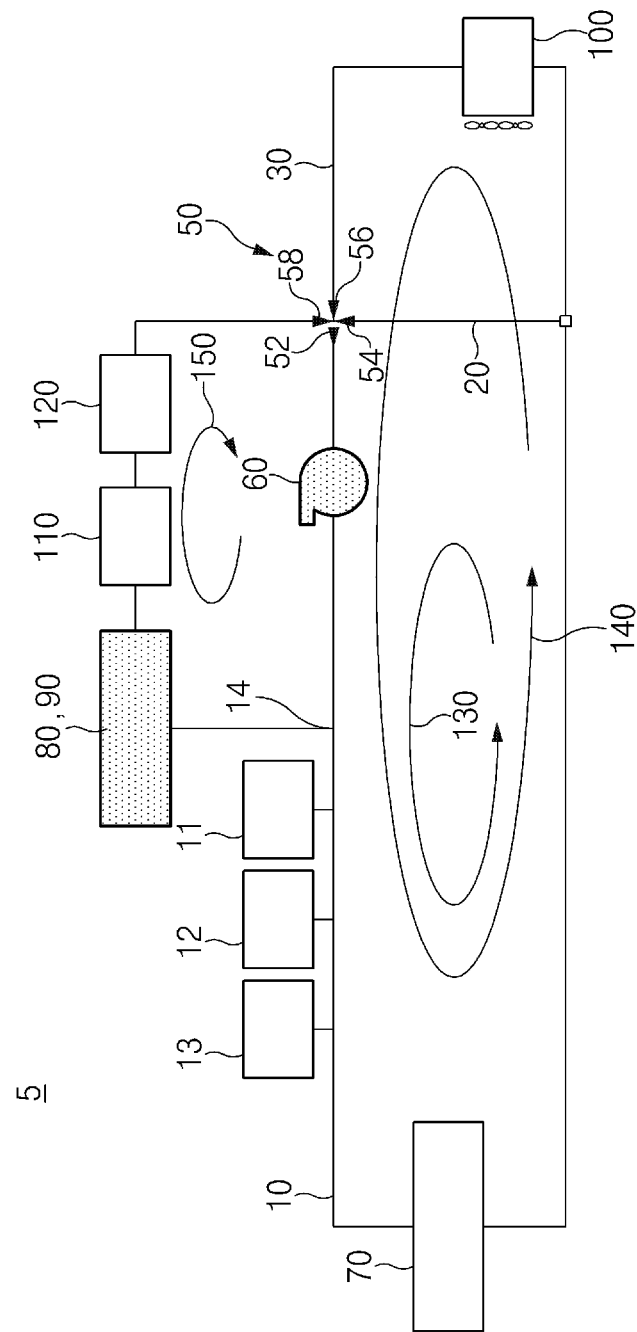
FIG. 10 is a conceptual view of a thermal management system for a fuel cell vehicle according to a fifth embodiment of the present disclosure.

FIG. 10 is a conceptual view of a thermal management system for a fuel cell vehicle according to a fifth embodiment of the present disclosure.

Referring to FIG. 10, a thermal management system 5 for a fuel cell vehicle according to the fifth embodiment of the present disclosure is different to the thermal management system 1 for a fuel cell vehicle according to the first embodiment of the present disclosure described above, in an installation position of the coolant heater 80 and the PCM 90.

In detail, as illustrated in FIG. 10, the coolant heater 80 and the PCM 90 are installed in the fourth line 40 so as to be positioned to be adjacent to a fourth port 58 of the opening and closing valve 50, relative to the heater 110. The PCM 90 is configured to be heat-exchanged with the coolant heater 80 and a coolant passing through the fourth line 40.

TABLE 6

|  | First Loop (130) | Second Loop (140) | Third Loop (150) |
|---|---|---|---|
| Temperature Sensor (11) | X | X | |
| Pressure Sensor (12) | X | X | |
| Conductivity Sensor (13) | X | X | |
| Coolant Pump (60) | X | X | X |
| Fuel Cell Stack (70) | X | X | |
| Coolant Heater (80) | | | X |
| PCM (90) | | | X |
| Radiator (100) | | X | |
| Vehicle Cabin Heater (110) | | | X |
| Ion Filter (120) | | | X |

Table 6 indicates the components that are connected by the respective loops in FIG. 10.

Hereinafter, a control method of a thermal management system for a fuel cell vehicle according to the fifth embodiment of the present disclosure will be described with reference to FIG. 11.

Figure 11:
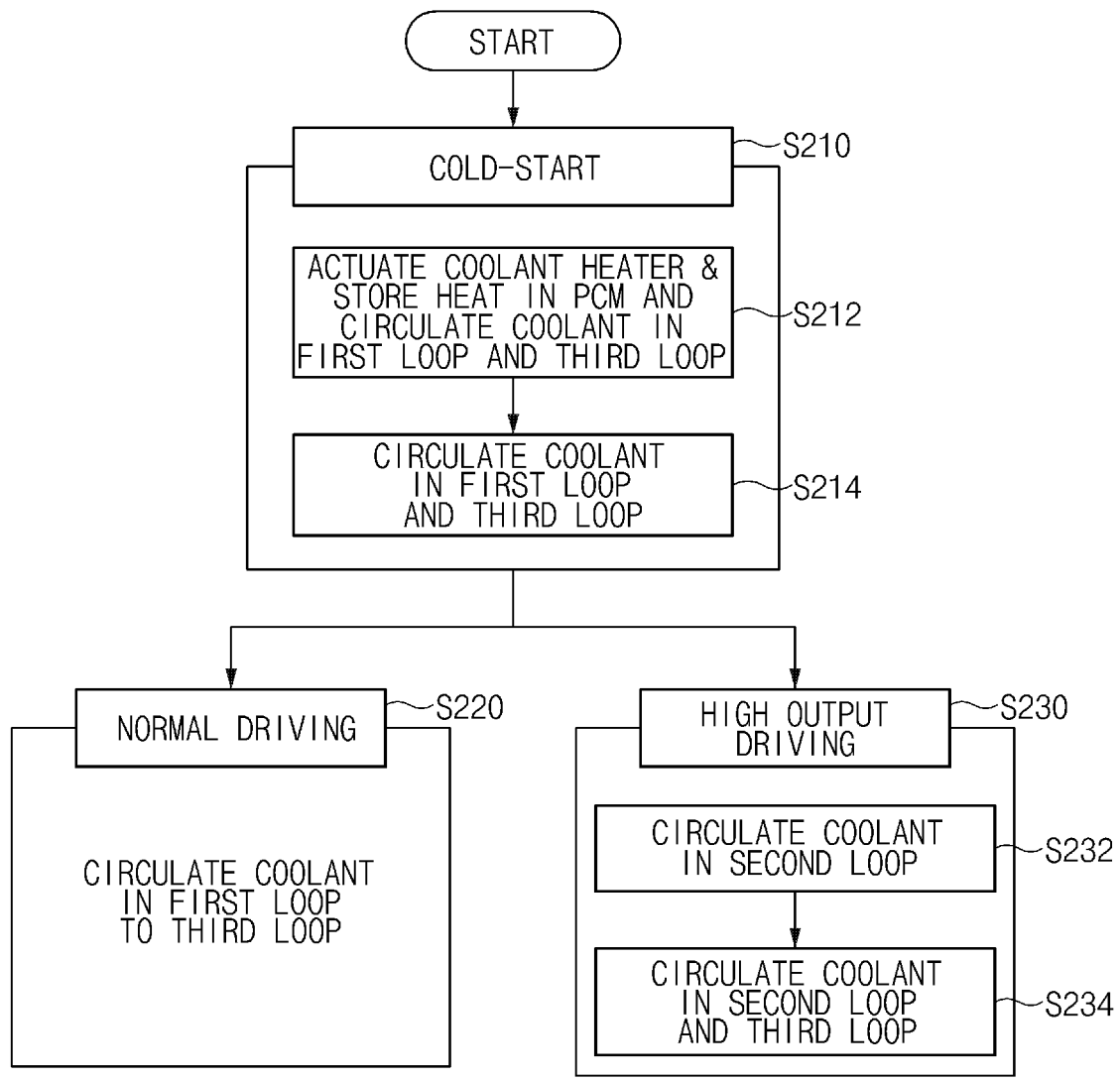
FIG. 11 is a flow chart illustrating a control method of the thermal management system illustrated in FIG. 10.

As illustrated in FIG. 11, the control method of a thermal management system for a fuel cell vehicle according to the fifth embodiment of the present disclosure may include a cold-starting operation S210, a normal driving operation S220, and a high output driving operation S230.

First, the cold-starting operation S210 may include an operation S212 of actuating the coolant heater 80 using electric power output from the stack 70 and circulating a coolant in the third loop 150 using the coolant pump 60 and the opening and closing valve 50 to store heat output from the coolant heater 80 in the PCM 90 and an operation S214 of circulating a coolant in the first loop 130 and the third loop 150 using the coolant pump 60 and the opening and closing valve 50 in a case in which a temperature of the PCM 90 is increased to a phase change temperature or higher, after the operation S212.

The operation S212 is preferably performed when the stack 70 is started in a state in which a temperature of a coolant measured by the temperature sensor 11 is lower than a cold-start temperature. The operation S212 is the same as the operation S12 described above, except that a coolant is circulated in the third loop 150 by actuating the coolant pump 60 and the opening and closing valve 50. According to the operation S212, the stack 70 is increased in temperature due to heat generated by the stack 70 itself and the PCM 90 stores heat generated by the coolant heater 80.

The operation S214 is preferably performed in a case in which a temperature of the PCM 90 measured by the temperature sensor 94 is increased to be equal to or higher than a phase change temperature. The operation S214 is the same as the operation S14 described above, except that a coolant is circulated in the first loop 130 and the third loop 150 to transfer heat stored in the PCM 90 to the stack 70 through a coolant circulating in the first loop 130. According to the operation S214, the stack 70 is increased in temperature due to heat generated by the stack 70 itself and the PCM 90 stores heat generated by the coolant heater 80.

The normal driving operation S220 may be performed in a case in which the stack 70 is actuated in a predetermined normal state after cold-starting is completed. In the normal driving operation S220, the coolant pump 60 is actuated to pump a coolant and the opening and closing valve 50 is actuated to circulate a coolant in the first loop 130 to the third loop 150 in a predetermined distribution ratio. The distribution ratio of the coolant is not particularly limited and may be selectively adjusted according to a state of the stack 70.

Thereafter, the high output driving operation S230 may be performed in a case in which the stack 70 is actuated in a predetermined high output state after cold-starting is completed. The high output driving operation S230 may include an operation S232 of circulating a coolant in the second loop 140 using the coolant pump 60 and the opening and closing valve 50 in a case in which the stack 70 is actuated in a predetermined high output state, after the cold-starting is completed, and an operation S234 of circulating a coolant in the second loop 140 and the third loop 150 in a predetermined distribution ratio using the coolant pump 60 and the opening and closing valve 50 when a temperature of the coolant reaches a predetermined coolant temperature limit value, after the operation S232.

The operation S232 may be performed when the stack 70 is actuated in a high output state but a temperature of the coolant does not reach the coolant temperature limit value yet. In the operation S232, the coolant pump 60 is actuated with a maximum output and the opening and closing valve 50 is actuated to circulate a coolant only in the second loop 140. Thus, in a state in which the coolant pump 60 is actuated with a maximum output, a coolant may be concentratedly supplied only to the radiator 100 to maximize heat dissipation of the radiator 100.

The operation S234 may be performed when the stack 70 is actuated in a high output state and a temperature of a coolant reaches a coolant temperature limit value. In the operation S234, the coolant pump 60 is actuated and the opening and closing valve 50 is actuated to circulate a coolant in the second loop 140 and the third loop 150 in a predetermined distribution ratio. In the operation S2334, since a coolant is not introduced to the fourth line 40, the PCM 90 is cooled to below a phase change temperature. In this state, when a coolant having a temperature increased to a coolant temperature limit value is introduced to the fourth line 40, the coolant passing through the fourth line 40 is cooled to the phase change temperature by the PCM 90. Thus, the thermal management system 5 for a fuel cell vehicle according to the fifth embodiment of the present disclosure may minimize a limitation in output of the stack 70 due to a high temperature of a coolant, compared with a case in which a coolant is cooled only using the radiator 100.

Figure 12:
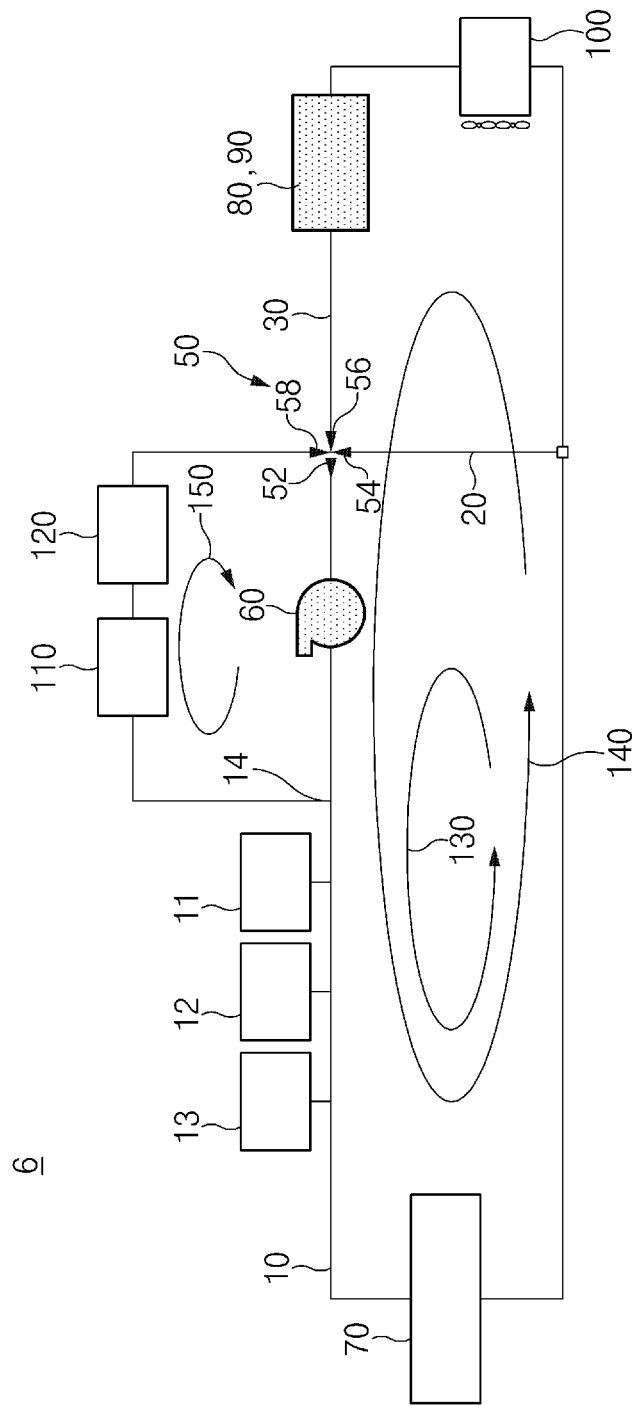
FIG. 12 is a conceptual view of a thermal management system for a fuel cell vehicle according to a sixth embodiment of the present disclosure.

FIG. 12 is a conceptual view of a thermal management system for a fuel cell vehicle according to a sixth embodiment of the present disclosure.

A thermal management system 6 for a fuel cell vehicle according to the sixth embodiment of the present disclosure is different to the thermal management system 1 for a fuel cell vehicle according to the first embodiment of the present disclosure, in an installation position of between the coolant heater 80 and the PCM 90.

In detail, the coolant heater 80 and the PCM 90 may be installed in the third line 30 such that the coolant heater 80 and the PCM 90 are positioned between the radiator 100 and the third port 56 of the opening and closing valve 50. The PCM 90 is heat-exchanged with a coolant passing through the coolant heater 80 and the third line 30.

The thermal management system for a fuel cell vehicle and the control method thereof according to embodiments of the present disclosure have the following advantages.

First, in the present disclosure, in order to perform cold-starting, heat generated by the coolant heater is stored in the PCM and supplied to the stack through a coolant, and thus, a time required for cold-starting may be reduced, compared with a case in which cold-starting is performed using only heat generated by the stack itself.

Second, in the present disclosure, in the case of high output driving, heat of a coolant is transferred to each of the radiator and the PCM to delay a time for a temperature of the coolant to reach a coolant temperature limit value, and thus, a limitation in an output of the stack due to a high temperature of the coolant is minimized.

Third, in the present disclosure, a loop of a coolant required for cold-starting may be simplified and the number of installed valves for adjusting flow of a coolant may be reduced.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A thermal management system for a fuel cell vehicle, the thermal management system comprising:
    a first line including a coolant pump and a fuel cell stack;
    a second line including a coolant heater and a phase change material (PCM) and connected to the first line to form a first loop in which the coolant pump, the stack, the coolant heater, and the PCM are arranged;
    a third line including a radiator and connected to the first line to form a second loop in which the coolant pump, the stack, and the radiator are arranged; and
    an opening and closing valve opening and closing each of the first line, the second line, and the third line to allow the coolant to circulate in at least one of the first loop and the second loop,
    wherein the PCM is configured to be heat-exchanged with each of the coolant heater and the coolant, and
    wherein the coolant heater includes:
        a heater core configured to heat the coolant,
        a heat pipe configured to thermally connect the heater core and the PCM, and
        a metal coil wound around the heater core and an outer circumferential portion of the second line to thermally connect the heater core and the second line.

2. The thermal management system according to claim 1, wherein:
    the coolant heater further has a heater housing configured to allow the coolant to pass therethrough,
    the heater core is installed within the heater housing, and
    the PCM is installed within the heater housing and is in contact with the coolant.

3. The thermal management system according to claim 2, wherein
    the heat pipe is installed within the heater housing.

4. The thermal management system according to claim 1, wherein
    the PCM has a phase change temperature lower than a predetermined coolant temperature limit value.

5. A control method of a thermal management system for a fuel cell vehicle according to claim 1, the control method comprising:
    (a) when a vehicle is started in a state in which the coolant has a temperature lower than a predetermined cold-start temperature, actuating the coolant heater using electric power output from the stack and storing heat output from the coolant heater in the PCM; and
    (b) when a temperature of the PCM is increased to the phase change temperature or higher, circulating the coolant in the first loop using the coolant pump and the opening and closing valve, after operation (a).

6. The control method according to claim 5, further comprising:
    (c) when the stack is actuated in a predetermined normal state, circulating the coolant in the first loop and the second loop in a predetermined distribution ratio using the coolant pump and the opening and closing valve, after operation (b).

7. The control method according to claim 5, further comprising:
    (d) when the stack is actuated in a predetermined high output state, circulating the coolant in the second loop using the coolant pump and the opening and closing pump, after operation (b); and
    (e) when a temperature of the coolant reaches a predetermined coolant temperature limit value, circulating the coolant in the first loop and the second loop in a predetermined distribution ratio using the coolant pump and the opening and closing valve, after operation (d),
    wherein the phase change temperature of the PCM is lower than the coolant temperature limit value.

8. The control method according to claim 7, wherein when operation (d) is performed, the coolant pump is actuated with a predetermined maximum output.

9. A thermal management system for a fuel cell vehicle, the thermal management system comprising:
    a first line including a coolant pump and a fuel cell stack;
    a second line including a coolant heater and a phase change material (PCM) and connected to the first line to form a first loop in which the coolant pump, the stack, the coolant heater, and the PCM are arranged;
    a third line including a radiator and connected to the first line to form a second loop in which the coolant pump, the stack, and the radiator are arranged; and
    an opening and closing valve opening and closing each of the first line, the second line, and the third line to allow the coolant to circulate in at least one of the first loop and the second loop,
    wherein the PCM is configured to be heat-exchanged with each of the coolant heater and the coolant,
    wherein:
        the coolant heater has at least one heater core disposed on the basis of the second line, the PCM is installed to surround at least a portion of the heater core and the second line, and the coolant heater further has a metal coil wound around the heater core and an outer circumferential portion of the second line to thermally connect the heater core and the second line.

\* \* \* \* \*